United States Patent Office 2,910,080
Patented Oct. 27, 1959

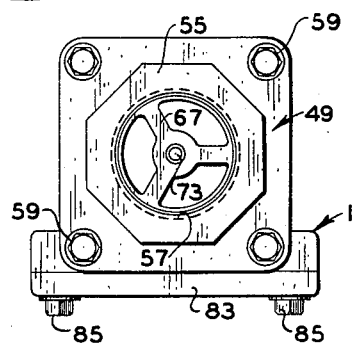
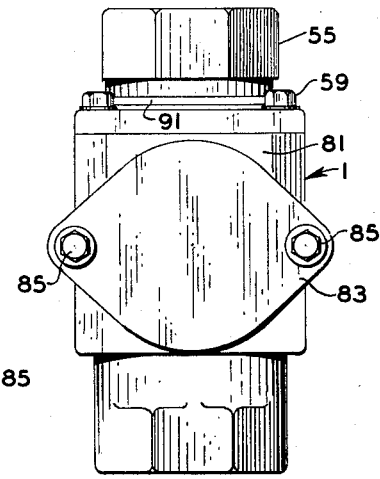
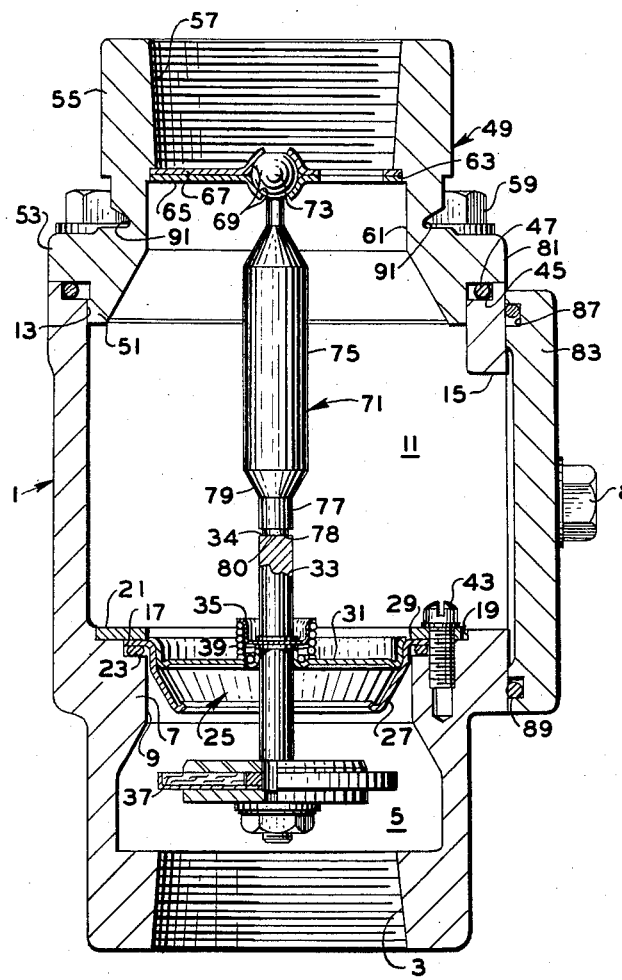
Fig. 2
Fig. 3
Fig. 1
GEORGE W. WRIGHT
JOHN C. KERR
*INVENTOR.*
BY Edmund M. C. Karmen
ATTORNEY

2,910,080

IMPACT RESPONSIVE VALVE

George W. Wright, Yoder, and John C. Kerr, Fort Wayne, Ind., assignors to Tokheim Corporation, Fort Wayne, Ind., a corporation of Indiana Application November 5, 1956, Serial No. 620,381

12 Claims. (Cl. 137—39)

This invention relates to an impact responsive valve. More specifically it relates to a valve, disposed in a liquid flow line, which is held open so long as the line is not subjected to severe shock or to displacement which could result in rupture of the line.

It is an object of the invention to provide a valve which can be readily reset to its open condition in the event that the shock administered to the line produced no damage sufficient to render it unusable.

Another object of the invention is to provide, in the valve body, a weakened section which will insure that the rupture of the line will occur in the valve body when the line receives a severe shock.

A further object of the invention is to provide a valve of the type mentioned above in which the fractured portion of the body can be quickly replaced.

Yet another object of the invention is to provide a valve of the kind described which is easy and economical to manufacture.

Still a further object of the invention is to provide in a valve of the kind described, a poppet type valve mechanism which can be readily removed from and replaced in the body as a unitary sub-assembly.

Still another object of the invention is to provide an impact responsive valve which when incorporated in all of the branch lines of a multi-dispenser system, and even though one or more of the pedestals have been damaged or one or more of the branch lines have been ruptured, permits the remaining undamaged pedestals to continue in service.

A further object of the invention is to provide an impact responsive valve which can, by simple alterations, be made to respond to shock of different magnitudes.

These and other objects will become apparent from a study of the drawings which are attached hereto, made a part hereof and in which:

Figure 1 is a vertical sectional view of the mechanism showing the valve body, the valve, the valve interponent and other details.

Figure 2 is a top view of the device of Figure 1.

Figure 3 is a side elevation of the device viewed from the right of Figure 1.

Referring particularly to Figure 1, the numeral 1 indicates the valve body which is provided with an internally threaded inlet 3 leading to a valve chamber 5. A radially, inwardly directed flange 7 of the body defines a passage 9 which communicates with the central or interponent chamber 11 having a bore 13 disposed coaxially with the inlet and formed at its upper end and a lateral bore 15 disposed at one side.

The flange 7, on the side adjacent chamber 11, is provided with a bore 17 and a shallow counterbore 19 to form supporting surfaces for an O-ring gasket 23 and a valve retaining ring 21 respectively.

A unitary valve assembly indicated generally by numeral 25 comprises a valve seat thimble or member 27 having a radial flange 29 adapted to rest upon the O-ring 23, a valve stem guide and spring seat 31 which nests in the bottom of the ring 27, a valve stem 33 which slides through the guide, carries a spring seat 35 intermediate its ends, and carries a valve 37 at its lower end. The upper end of the stem has a flat surface 34 disposed normally to the axis of the stem. A helical compression spring 39 is disposed around the stem and has its ends bearing on said seats 31 and 35.

The retainer ring 21 is drawn down on the body by suitable screws 43 which enter the body from chamber 11 and since the ring overlaps flange 29 of the valve ring, it serves to depress the latter so as to compress the O-ring 23 to seal the joint.

Bore 13 is counterbored at 45 to form a recess for the O-ring gasket 47.

A cover or plug 49 has an axial pilot boss 51 which fits in the bore 13 to complete the valve casing, has a radial flange 53 which extends outwardly over the counterbore 45 and has an axially upwardly directed discharge boss 55 which defines an internally threaded outlet 57. The cover is held in place on the upper end of body 1 by screws 59 which, when drawn down, cause flange 53 to compress gasket 47 to seal the joint.

The plug is bored at 61 on the side adjacent chamber 11 and has a counterbore 63 in which are seated a pair of spiders 65, 67 which have their central portions cupped in opposite directions to form a spherical socket 69.

A weighted pendant or interponent 71 has a ball journal 73 at its upper end which is received in the socket 69. The central portion 75 of the pendant is enlarged in diameter so as to increase the weight and consequently the inertia of the pendant. The lower end of the interponent is provided with an axially extending boss 78 of less diameter than the end 77 and the end surface 80 of the boss is flat and is disposed normal to the axis of the interponent.

The outline of the enlarged portion 75 of the interponent is joined with that of the portion 77 by a conical section 79 so that the valve stem cannot be caught on the interponent and be held thereby in a partially open condition when it should be closed.

In the normal, open condition of the valve, the surfaces 34 and 80 are parallel and are held in intimate contact by the valve spring as shown in Figure 1.

The lateral bore 15 terminates in a planar surface 81 on the exterior of body 1 and a cap 83 fits on said surface and is held in place thereon by screws 85. The cap is provided with a groove 87 which encircles the opening 15 and receives an O-ring gasket 89 which is held compressed between the bottom of groove 87 and surface 81 by screws 85 so as to seal the joint.

It will be noted from Figure 1 that plug 49 is encircled by a V-shaped groove 91 which substantially reduces the wall thickness of the plug on a line below the counterbore 63 and the spiders 65, 67. The strength of the plug at this section is less than that of any other portion of the plug or body and less than that of the pipes which are connected to the body. Thus any impact transmitted to the plug or any radical displacement of any element connected with the plug which would be severe enough ordinarily to rupture the line will cause the plug to fracture along the groove substantially before such strains can be applied to the connected elements thus preventing the rupture which might otherwise occur.

Operation

While the valve disclosed herein has a number of applications, it is particularly useful in fuel dispensing systems, such as are used in automobile filling stations, in which a pump is submerged in a tank or is otherwise located remotely from the dispensing pedestals and in which a number of pedestals, each having its individual switch to start and stop the pump, are connected by branch pipes to the main pump discharge line. Such a system is disclosed in the patent to G. W. Wright et al., Number 2,732,103 issued January 24, 1956.

The valve is installed in each branch line just below the pedestal and has its outlet connected, usually by a nipple and separable union, to the pedestal.

In the case of such a system which does not employ the valves described above it is quite possible that while the service station attendant may have started the pump and may be delivering fuel to a customer from one pedestal, another pedestal which is also under pressure from the same pump and which may even be out of sight of the operator, may be rammed by a car or other vehicle being operated in the service area. Should the collision be of sufficient force to spring leaks in the piping or connections or should it be severe enough to fracture or rupture them, the fuel would flow from the openings resulting from the collision and spread out over the surrounding area creating a serious fire hazard. At the same time the operator might be entirely unaware of what has occurred and allow the pump to continue in operation thus aggravating the situation.

To prevent such an occurrence, the branch pipe leading to each pedestal may be connected to the inlet 3 of the valve disclosed herein, at about the level of the island, while the outlet 57 is connected to the inlet pipe of the dispenser as explained above. Before the system is operated the cover 83 will be removed by removing screws 85, valve stem 33 will be depressed either with a finger or tool until the interponent 71, which swings freely in the spherical bearing 69, assumes the position of Figure 1 with respect to the valve stem 33. Upon release of the stem, the spring 39 will raise the stem until the face 34 on the upper end of stem 33 is in contact with the face 80 of boss 78. The interponent should be moved, if necessary, to secure parallel, face to face contact between the surfaces. The valve 37 will thus be held open but will be continually urged toward closed position by the spring 39 and also by any liquid which may flow through the body in a normal manner.

The cap may then be replaced and the screws when drawn up render the seal 89 effective. The pedestal is then ready for operation.

Obviously the branch pipes of all of the pedestals should be equipped with the valve to obtain full benefits therefrom.

Under ordinary vibration such as that caused by vehicular traffic and operation of the pedestal and under impacts of minor magnitude, the frictional resistance of the contacting surfaces 34 and 80 will exceed the forces tending to cause relative lateral displacement of the interponent and the valve stem so that the valve will be held open under ordinary operating conditions.

Should a relatively severe shock or impact be imparted to the pedestal or to the piping, the device will respond thereto in one of two ways.

Should the blow be of sufficient magnitude to cause the inertia force of the interponent to exceed the frictional force between surfaces 34 and 80, the valve stem will be displaced relative to the interponent so that the valve will be released, whereupon the spring 39 will close the valve 37 on its seat, aided by any liquid flow through the body.

In the event the blow is of a magnitude sufficient to cause or threaten to cause a rupture in any part of the piping or valve, connecting the pedestal with the branch pipe, fracture will occur at the weakened section 91 of plug 49 before the full force of the blow can be applied to the rest of the piping. In this case the supporting spiders 65, 67 will be displaced along with the top portion of the plug, above the weakened section and this makes doubly certain that the interponent will be displaced to free the valve for closure.

It should also be noted that even though one branch from the discharge line may be closed as described above, the outlet is sealed off so that the other pedestals connected in the system may still be used. Unless such valves are installed in the branches, the rupture of one branch prevents the operation of all of the pedestals connected in the system.

In order to replace a broken plug, it is necessary merely to remove the screws 59, uncouple the union usually provided above the valve, unscrew the upper part of the plug from the nipple and withdraw the lower part of the plug and the interponent from the body 1. After a new plug fitted with an interponent has been screwed on the nipple and placed in position in the bore 13, it is necessary merely to insert the screws and remake the union. If care has been exercised in replacing the plug, the interponent will have opened the valve and the unit will be ready to use. If this is not the case, a few additional minutes may be required to reset the valve by removing cap 83 as described above.

Even in the latter case, the time required to effect the repair is enormously less than that required to repair an outlet in which the branch line has broken off below the ground level. Such rupture usually occurs at the threads used to connect the branch line with the main discharge pipe and the removal of the broken off end presents an arduous task.

In the event it should be desired to replace the valve assembly 25 or gasket 23, this can be done relatively quickly by removing the plug as described above and, in addition, removing screws 43 and retainer 21 after which the entire valve assembly may be lifted out of the body as may the gasket 23 and new ones may be substituted, after which the parts may be reassembled. No screwed pipe connections need be disturbed to make the change and only the tools usually carried by a service mechanic are required to perform the task.

It should be noted that by altering the diameter of boss 78 of the interponent, the magnitude of the shock or impact which the valve will sustain before it trips may be changed.

A study of Figure 1 will disclose the fact that in order for the boss 78 to move off from the face of the valve stem, one edge of the boss must traverse the face of the stem. Since the distance from the center of the journal 73 to the center of the face of the boss is shorter than that to the edge of the boss, in order for the boss to clear the stem it must depress the stem slightly against the action of the spring 39. The greater the diameter of the boss the greater will be the movement of the valve required to free the boss. Accordingly the greater the magnitude of the shock or impact required to free the valve from the interponent.

Conversely, the smaller the diameter of the boss, the more sensitive the device becomes.

The sensitivity of the device may also be varied by varying the strength of the spring 39 or by a combination of changes in both the size of the boss and the strength of the spring. Thus the sensitivity of the mechanism can be rather finely controlled to suit the requirements of any installation.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. In a shock responsive valve, a body defining a chamber having an inlet at the bottom disposed on a substantially vertical axis and having an outlet, a valve seat surrounding said inlet and disposed exteriorly of said chamber, means for mounting a poppet type valve on said casing for cooperation with said seat, said valve having a stem extending into said chamber through said inlet spring, means for urging said valve toward the seat, an elongated, streamlined, combined weight and interponent, universal bearing means supported on said body for suspending said interponent by one end so that it will depend into said chamber, said bearing means being disposed at a predetermined distance above said valve seat above and in substantially coaxial alignment with said stem for end to end engagement therewith, said stem and interponent having a combined length which is greater than the distance between said bearing means and said valve seat so that said stem and interponent, when engaged, will hold the valve open, said stem and interponent being relatively movable out of engagement in response to a shock force having a component directed normal to said axis, which exceeds the resistance of the stem and interponent to relative displacement in such direction.

2. The structure defined by claim 1 wherein said body defines a lateral opening providing access to said interponent and stem for arranging them in alignment, and a removable cover for the opening.

3. The structure defined by claim 1 wherein said interponent terminates at the end contacting the stem in a flat end surface of reduced diameter, wherein said valve stem is provided with a mating flat surface, the size of the reduced diameter being predetermined in accordance with the magnitude of the maximum shock to be sustained without closing the valve.

4. The structure defined by claim 1 wherein said combined weight and interponent of generally cyclindrical form with the diameter of the center portion thereof greater than that of the valve stem contacting portion but small relative to its length and with the lower end of said center portion terminating in a downwardly converging taper to prevent arresting engagement thereof with said stem and to present a streamlined shape to the liquid flowing through said chamber.

5. In a shock responsive valve, a valve body defining a chamber having a bottom inlet and a top outlet, disposed substantially vertically and coaxially, a valve seat for said inlet and disposed exteriorly of said chamber, means for mounting a poppet type valve on said body for cooperation with said seat, said valve having a stem extending into said chamber through said inlet, spring means for urging the valve toward said seat, a cover for said outlet mounted on said body and having an outwardly extending hollow discharge boss, bearing supporting means mounted on said cover having a universal bearing disposed substantially concentrically with said stem, an elongated, streamlined, combined weight and interponent having a journal at one end and a stem engaging boss at the other, said journal being supported in said bearing so that said interponent will depend into said chamber, said bearing being disposed at a predetermined, fixed distance above said valve seat and substantially coaxial with said valve stem said stem and interponent having a combined length which is greater than the distance between said bearing and said seat so that said stem and interponent, when engaged, will hold the valve open, said stem and interponent being relatively movable out of engagement in response to a shock force having a component directed normal to the axis of the valve stem, which exceeds in magnitude the resistance of the stem and interponent to relative displacement in such direction.

6. The structure defined by claim 5 wherein said discharge boss is provided with a counterbore and said bearing supporting means comprise spider means inserted in the counterbore.

7. The structure defined by claim 5 wherein said body defines a lateral access opening disposed between the inlet and outlet through which said valve stem and interponent are accessible for manipulation into axial alignment and a removable cover for sealingly closing said access opening.

8. In a shock responsive valve, a body defining a chamber having an inlet at the bottom disposed on a substantially vertical axis and having an outlet, a valve seat surrounding said inlet and disposed exteriorly of said chamber, means for mounting a poppet type valve on said casing for cooperation with said seat, said valve having a stem extending into said chamber through said inlet, yieldable means for urging said valve toward the seat, an elongated, weighted interponent, universal bearing means supported on said body for suspending one end of said interponent in said chamber, above and in substantially coaxial alignment with said stem for end to end engagement therewith, said stem and interponent having a combined length which is greater than the distance between said bearing means and said seat so that said stem and interponent, when engaged, will hold the valve open, said stem and interponent being relatively movable out of engagement in response to a shock force having a component directed normal to said axis, which exceeds the resistance of the stem and interponent to relative displacement in such direction, said body defining a groove disposed between said valve seat and the universal bearing means to provide a section of minimum strength adapted to fracture in response to severe shock and to free the interponent for displacement away from the valve stem.

9. In a shock responsive valve, a body defining a chamber having an inlet at the bottom disposed on a substantially vertical axis and having an outlet, a valve seat surrounding said inlet and disposed exteriorly of said chamber, means for mounting a poppet type valve on said casing for cooperation with said seat, said valve having a stem extending into said chamber through said inlet, yieldable means for urging said valve toward the seat, an elongated, weighted interponent, universal bearing means supported on said body for suspending one end of said interponent in said chamber, above and in substantially coaxial alignment with said stem for end to end engagement therewith, the end of said interponent contacting said valve stem having a flat surface of reduced diameter, and the end of said valve stem having a mating flat surface, the size of said reduced diameter being predetermined in accordance with the magnitude of the maximum shock to be sustained without closing the valve, said stem and interponent having a combined length which is greater than the distance between said bearing means and said seat so that said stem and interponent, when engaged, will hold the valve open, said stem and interponent being relatively movable out of engagement in response to a shock force having a component directed normal to said axis, which exceeds the resistance of the stem and interponent to relative displacement in such direction, said body defining a groove disposed between the valve seat and the universal bearing means to provide a section of minimum strength adapted to fracture in response to severe shock and to free the interponent for displacement away from the valve stem, the magnitude of the maximum shock required to displace said interponent from said valve stem being less than the shock required to fracture the body.

10. In a shock responsive valve, a valve body defining a chamber having a bottom inlet and a top outlet, disposed substantially vertically and coaxially, a valve seat for said inlet and disposed exteriorly of said chamber, means for mounting a poppet type valve on said body for cooperation with said seat, said valve having a stem extending into said chamber through said inlet, yieldable means for urging the valve towards said seat, a cover for said outlet having an outwardly extending hollow discharge boss defining a counterbore adjacent its inlet, a pair of spiders disposed in said counterbore, each spider having a central hub which is dished to form a substantially hemispherical cavity, said spiders being arranged in juxtaposition with said cavities defining a substantially spherical bearing disposed substantially concentric with said valve stem, an elongated, weighted interponent having a journal at one end and a stem engaging boss at the other, said journal being supported in said bearing, said stem and interponent having a combined length which is greater than the distance between said bearing and said seat so that said stem and interponent, when engaged, will hold the valve open, said stem and interponent being relatively movable out of engagement in response to a shock force having a component directed normal to the axis of the valve stem, which exceeds in magnitude the resistance of the stem and interponent to relative displacement in such direction.

11. In a shock responsive valve, a valve body defining a chamber having a bottom inlet and a top outlet, disposed substantially vertically and coaxially, a valve seat for said inlet and disposed exteriorly of said chamber, means for mounting a poppet type valve on said body for cooperation with said seat, said valve having a stem extending into said chamber through said inlet, yieldable means for urging the valve toward said seat, a cover for said outlet mounted on said body and having an outwardly extending hollow discharge boss, bearing supporting means mounted on said cover having a universal bearing disposed substantially concentrically with said stem, an elongated, weighted interponent having a journal at one end and a stem engaging boss at the other, said journal being supported in said bearing, said stem and interponent having a combined length which is greater than the distance between said bearing and said seat so that said stem and interponent, when engaged, will hold the valve open, said stem and interponent being relatively movable out of engagement in response to a shock force having a component directed normal to the axis of the valve stem, which exceeds in magnitude the resistance of the stem and interponent to relative displacement in such direction, said discharge boss having a groove disposed below said bearing supporting means, to provide a section of minimum strength adapted to fracture in response to severe shock and to free said interponent and valve stem.

12. In a shock responsive valve, a valve body defining a chamber having a bottom inlet and a circular bore defining a top outlet, disposed substantially vertically and coaxially, a unitary structure comprising a poppet type valve, valve seat and a spring for closing said valve, means for sealingly mounting said structure in position to control said inlet, with said valve disposed exteriorly of said chamber, said valve having a stem extending into said chamber through said inlet, said circular bore being of greater diameter than said unitary structure and said mounting means to permit insertion and removal thereof through the bore, a cover for said outlet having a pilot boss adapted to removably fit said bore and having an outwardly extending hollow discharge boss, bearing supporting means mounted on said cover having a universal bearing disposed substantially concentrically with said stem, an elongated, weighted interponent having a journal at one end and a stem engaging boss at the other, said journal being supported in said bearing, said stem and interponent having a combined length which is greater than the distance between said bearing and said seat so that said stem and interponent, when engaged, will hold the valve open, said stem and interponent being relatively movable out of engagement in response to a shock force having a component directed normal to the axis of the valve stem, which exceeds in magnitude the resistance of the stem and interponent to relative displacement in such direction.

References Cited in the file of this patent

UNITED STATES PATENTS

| | | |
|---|---|---|
| 704,529 | Foskett | July 15, 1902 |
| 1,712,498 | Hawxhurst | May 14, 1929 |
| 2,048,388 | Johnsen | July 21, 1936 |
| 2,255,965 | Brandon | Sept. 16, 1941 |